Figure 1:
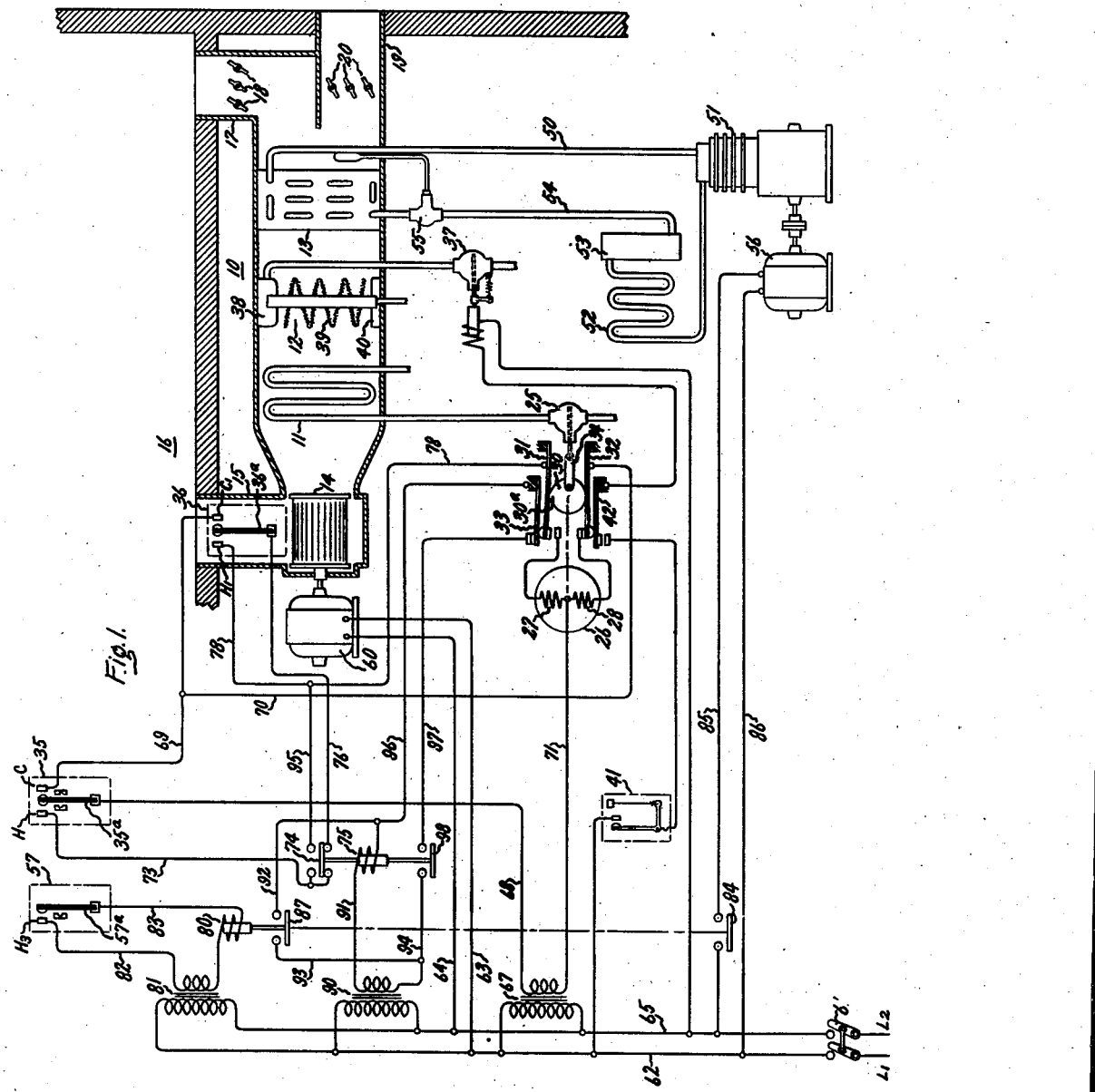

Inventor
Wallace B. Miller,
by Harry E. Dunham
His Attorney.

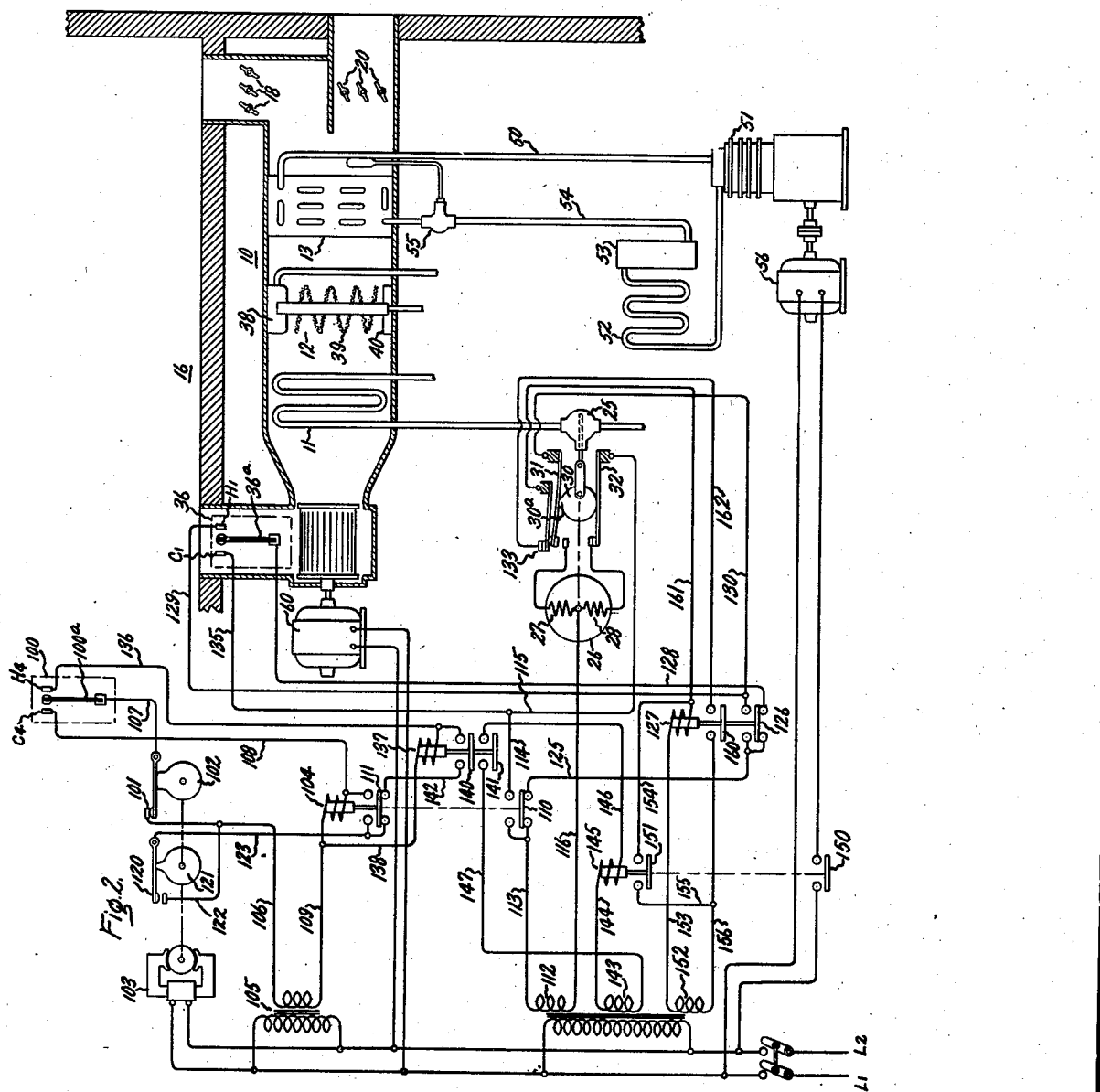

Patented Aug. 28, 1945

2,383,811

UNITED STATES PATENT OFFICE 2,383,811

TEMPERATURE CONTROL SYSTEM AND APPARATUS

Wallace B. Miller, West Caldwell, N. J., assignor to General Electric Company, a corporation of New York Application March 13, 1943, Serial No. 479,087

7 Claims. (Cl. 257—3)

The invention relates to temperature control systems and is particularly adapted for air conditioning service. In such service the invention provides an improved automatic multiple thermostat control system for controlling year round air conditioning equipment so as to obtain automatic selective heating and cooling and ventilating air tempering operation.

A special object is to provide an improved automatic selective multiple thermostat temperature control system that is capable of shifting between heating operation of the air conditioning equipment under control of the room thermostat, ventilating air tempering operation under control of a duct air temperature responsive thermostat, and cooling operation under control of the room thermostat in accordance with different predetermined variations in the room temperature outside and into a predetermined range. Thus the improved control system and apparatus eliminates the necessity of manually operating selective heating, cooling, and tempering switches or valves such as heretofore required. Consequently, the improved temperature control system is particularly advantageous in air conditioning service during spring and fall when heating may be required in the morning, only fresh air tempering at noon, and cooling during the afternoon.

A further object is to selectively render a fresh air tempering control thermostat ineffective upon cooling operation of the air conditioner under the control of the room thermostat, and effective to control the fresh air tempering operation of the air conditioner only after a subsequent heating operation thereof under control of the room thermostat.

A more specific object is to provide automatic interlocking means for enabling the room thermostat to transfer the control of a reversible motor operated valve that effects the room heating operation of the air conditioner to a duct air temperature responsive thermostat so as to effect ventilating air tempering operation thereof, while insuring that the heating valve is always closed upon room cooling operation of the conditioner under control of the room thermostat and thereafter remains closed until a room heating operation of the conditioner occurs.

Other objects and advantages of the invention will be pointed out in the following description of the accompanying drawings in which Fig. 1 schematically shows a year round air conditioner having a multiple thermostatic control system embodying the improvements of the present invention; and Fig. 2 shows the year round air conditioner provided with a modified form of multiple thermostatic control system embodying the invention.

The year round room air conditioner 10, shown schematically in Fig. 1, is provided with an air heating steam coil 11, a humidifier 12 and an air cooling heat exchanger 13. The conditioned air serves as a heat transfer medium that is circulated by the motor driven blower 14 through the duct 15 into the room 16. Recirculated air from room 16 is supplied to the conditioner 10 through the duct 17, the flow being controlled by dampers 18. Fresh air for ventilation is admitted to the conditioner 10 through the duct 19 with the flow controlled by the damper 20.

Steam is supplied to the air heating coil 11 under the control of the reversible motor operated valve 25 having the driving motor 26 provided with a closing winding 27 and an opening winding 28. Motor 26 drives through suitable speed reducing gearing (not shown) the disc 30 which opens and closes the valve 25 by means of the connecting rod 34. As shown diagrammatically in the drawings, the disc 30 also may be provided with a point cam 30a for opening the closing limit switch 31 when the valve is in its closed position and opening the opening limit switch 32 when the valve is in the open position. A special interlocking switch 33 is normally biased to the circuit opening position and is arranged to be closed only when the steam valve 25 is in its closed position.

The reversible valve operating motor 26 is, in accordance with the present invention, energized under the joint control of the two-position room thermostat 35 and the two-position duct thermostat 36, the former being able only to energize the motor 26 to open the valve 25 in response to a drop in the temperature of the room 16 and the latter being able to energize the motor 26 to both close and open the valve 25 in response to variations in the temperature of the air supplied through the duct 15 from the conditioner 10 to the room. Thus according to the present invention, the joint thermostatic reversing motor control arrangement is such that the valve 25 will be operated to its open position to admit steam to the air heating coil 11 whenever the room temperature falls below a predetermined minimum desired value to which the room thermostat 35 is set. However, when the room temperature rises above the minimum desired value to which room thermostat 35 is set, then the reversing control of the valve operating motor 26 is automatically transferred to the duct thermostat 36 so as to enable the air heating coil 11 to variably temper the fresh ventilating air circulated to the room 16 and thus always maintain the temperature of the ventilating air supplied to the room through the duct 15 above a predetermined value that will not cause discomfort. The improved reversing motor transfer circuit arrangement whereby this desirable result is obtained is described hereinafter in connection with the operation of Fig. 1.

The operation of the humidifying apparatus 12 may be controlled by an electromagnetic valve 37 for regulating the admission of water to a distributing tank 38 from which it falls over the humidifying screens 39 into the drain tank 40. The energization of the humidifying valve 37 preferably is controlled by a humidostat 41 with the interlock switch 42 provided to insure that humidification can occur only when the steam valve 25 is in its fully open position.

The air cooling heat exchanger 13 comprises a refrigerant evaporator that is connected by a refrigerant line 50 with the compressor 51 so as to withdraw the refrigerant medium that is evaporated in the heat exchanger 13. The medium, after passing through the compressor 51, is supplied to a condenser 52, from which the condensed liquid flows into the receiver 53. Liquid refrigerant is then supplied from the receiver 53 through the refrigerant line 54 under the control of the thermostatic expansion valve 55 to the evaporating coils of the air cooling heat exchanger 13. The compressor 51 is operated by the motor 56 which is energized under the control of the room cooling control thermostat 57 when the room temperature exceeds a predetermined maximum desired value.

In accordance with the present invention, the minimum temperature responsive room heating control thermostat 35, the duct air temperature responsive tempering control thermostat 36 and the maximum temperature responsive room cooling control thermostat 57 are interlocked in a selective thermostatic control system such that whenever the cooling thermostat 57 starts the compressor 51 into operation at the maximum temperature, the steam valve 25 will always be closed and cannot be reopened except under the control of the room heating control thermostat 35 at the minimum temperature. The selective interlocking arrangement is such that the duct air temperature responsive thermostat 36 is rendered effective to control the closing and opening of the steam heating valve 25 only when the room temperature rises into the temperature range between the minimum and maximum values, but is rendered ineffective upon a call for cooling operation by the room cooling thermostat 57 and remains ineffective until after a subsequent call for heat by the room thermostat 35.

*Operation of Fig. 1*

The motor 60 that drives the air circulating blower 14 preferably is connected to be energized from the supply lines L1, L2 upon closure of main power supply switch 61, the circuit extending from supply line L1, through conductors 62, 63, motor 60, conductors 64 and 65 to supply line L2. Thus, the air circulating blower 14 will operate continuously as long as the main power supply switch 61 is closed. Whenever the room temperature falls below the predetermined minimum value at which heating operation of the air conditioner 10 is desired, the room air temperature responsive heating control thermostat 35 will move its blade 35a into engagement with contact C thereby establishing an energizing circuit for the opening winding 28 of the steam valve operating motor 26. This circuit may be traced from the secondary of transformer 67 through conductor 68, the blade 35a in engagement with contact C, conductors 69 and 70, the limit switch 32, the motor opening winding 28, and thence through conductor 71 to the other side of the secondary transformer 67. As a result, motor 26 will operate the disc 30 to open the valve 25 and admit steam to the air heating coil 11. When the steam valve 25 is operated to its fully open position, the cam point 30a of disc 30 engages with the limit switch 32 to open the energizing circuit for the opening winding 28. However, valve 25 will remain in the fully open position so as to continue to supply steam to the air heating coil 11.

When the resulting transfer of heat from the conditioner 10 to the room 16 through the medium of the circulating air raises the temperature of room 16 sufficiently to effect the movement of the blade 35a of the room thermostat into engagement with the contact H, then the selective control of the energization of the valve opening and closing windings 27 and 28 is transferred to the duct thermostat 36. This control transfer circuit may be traced from the secondary of transformer 67 through conductor 68, the blade 35a of the room thermostat in engagement with contact H, conductor 73, interlock contact 74 of the interlocking relay 75, conductor 76, to the blade 36a of the duct thermostat 36. In case the temperature of the air circulated to room 16 through the duct 15 remains above a predetermined desired value, the blade 36a of the duct thermostat will engage its contact H1, but in case it falls below this value, it will engage the contact C1. Only in the latter case will the valve opening winding 28 be energized through a circuit including the conductors 69, 70, limit switch 32, opening winding 28, and conductor 71. In the former case, the valve closing winding 27 will be energized through a circuit extending from the blade of duct thermostat 36 through contact H, conductor 78, limit switch 31, closing winding 27, and conductor 71. Thus, after the temperature of room 16 has been raised into the range in which the room heating control thermostat 35 becomes satisfied, the duct thermostat 36 is rendered effective to close or open the steam valve 25 so as to produce a sufficient heating action in the air heating coil 11 to temper the ventilating air circulated into the room 16. In this way the temperature of the ventilating air may be maintained at a desired value, irrespective of the manual adjustments of the dampers 18 and 20, and irrespective of the temperature of the fresh air supplied through the duct 19. In ordinary service, the room heating control thermostat 35 may be set to produce room heating action of the conditioner 10 whenever the room temperature falls below some minimum desired value such, for example, as 70°. The duct thermostat 36 may be set to maintain the ventilating air at substantially the same temperature of 70° or, if desired, at either a lower or higher temperature. In any case, the air tempering control action of the duct thermostat 36 effectively insures against circulation of ventilating air at a low temperature such that discomfort might result.

The room cooling control thermostat 57 ordinarily will be set to start operation of the air cooling apparatus whenever the room temperature exceeds some maximum desired value such, for example, as 80°. In case the room temperature exceeds this value, the blade 57a will engage contact H₃ and thereby energize the compressor starting relay 80 from the secondary of transformer 81 through the conductors 82 and 83. The resulting closure of relay contact 84 will complete the energizing circuit for the compressor driving motor 56 through the conductors 85, 86. As a result, the compressor 51 is started into operation to withdraw heat from the heat exchanger 13 and thereby cool the air supplied from the conditioner 10 to the room 16.

When the compressor starting relay 80 closes, the auxiliary contact 87 thereof completes an energizing circuit for the interlock relay 75 extending from the secondary of transformer 90 through conductor 91, the operating winding of relay 75, conductor 92, auxiliary contact 87 in its closed position, and conductors 93 and 94. Thereupon interlock relay 75 operates its double function contact 74 to render the duct thermostat 36 ineffective to control the motor operated valve 25 by opening the control circuit to the duct thermostat blade 36a through conductor 76. At the same time, the double function contact 74 completes a safety circuit for energizing the closing winding 27 of the motor 26; this circuit extending from the secondary of transformer 67, conductor 68, the blade 35a of the heating control thermostat in engagement with contact H, conductor 73, contact 74 in its upper circuit closing position, and thence through conductors 95 and 78, limit switch 31, closing winding 27, and conductor 71.

The establishment of the safety energizing circuit for closing winding 27 insures that the motor 26 will operate the steam control valve 25 to the closed position thereby closing the special valve interlock switch 33, as shown in the drawings, independently of the control of the duct thermostat 36 in case the valve 25 and switch 33 are not already in the closed position. However, under normal operating conditions, the steam valve 25 will ordinarily be closed before the room temperature reaches the maximum desired value at which the cooling thermostat 57 closes its contacts. In any case, when the interlock relay 75 is energized, the special valve interlocking switch 33 will be closed to complete a holding circuit for maintaining the interlock relay 75 energized independently of the auxiliary contact 87 of the compressor starting relay 80. The holding circuit for the interlock relay 75 extends from the secondary of transformer 90 through conductor 91, relay winding 75, conductor 96, interlock switch 33, conductor 97, the holding contact 98 of the interlock relay 74 in its closed position, and conductor 94. This holding circuit serves to maintain the interlock relay 75 energized and thus maintain duct thermostat 36 ineffective not only while the compressor 51 is in operation, but as long thereafter as the room temperature remains within the predetermined temperature range having minimum and maximum limits determined by the setting of the the room heating thermostat 35 and the setting of the room cooling thermostat 57. The only way that the holding circuit of the interlock relay 75 can be opened is by the room temperature falling below the minimum value at which the room heating control thermostat 35 is set to engage its blade 35a with the contact C and energize the opening winding 28 through the circuit previously traced to effect the opening of the steam valve 25. When this occurs, the special valve interlock switch 33 opens the holding circuit of the interlocking relay 75 to enable this relay to return to the position to which it is biased, as shown in the drawings. This returns the double function contact 74 to its lower circuit closing position, in which it is shown, so as to again transfer the control of the steam valve to the duct thermostat 36 when the room thermostat 35 engages its blade 35a with contact H. This latter will occur only when the temperature of the room 16 rises into the temperature range that is determined by the settings of the room heating control thermostat 55 and room cooling control thermostat 57.

*Operation of Fig. 2*

In the modified temperature control system shown in Fig. 2, a double contact room heating and cooling control thermostat 100 is combined with an intermittent overlapping double contact circuit opening and closing device of the type more fully described and claimed in the Crago Patent 2,202,731 for controlling the operation of the air conditioner 10 in conjunction with the duct thermostat 36. This modified system operates as follows. When the room temperature falls below the heating limit of the temperature range to which the thermostat 100 is adjusted, the blade engages with the contact C₄. Then, when the intermittent contact 101 is closed by the cam 102 that is continuously operated by the timing motor 103, an energizing circuit for the steam valve control relay 104 is established from the secondary of transformer 105 through conductors 106, the closed contact 101, conductor 107, the blade 100a of the room thermostat in engagement with contact C₄, conductor 108, the operating winding of relay 104, conductor 109. As a result, relay 104 moves both its contacts 110 and 111 from their lower circuit closing positions, in which they are shown, to their upper circuit closing positions. Contact 110 in its upper circuit closing position establishes an energizing circuit from the transformer secondary winding 112 through conductors 113, 114, 115, limit switch 32, the valve opening motor winding 28, conductor 116 to effect opening of the steam supply valve 25. When valve 25 reaches the full open position, the cam point 30a of disc 30 opens the limit switch 32 and the valve 25 continues to supply steam to the air heating coil 11 so as to effect a rise in the room temperature due to the transfer of heat by the circulating air heat transfer medium.

Contact 101 in its upper circuit closing position cooperates with the periodic contact 120 when it is closed by cam 121 before contact 101 is opened by cam 102 to establish a holding circuit for relay 104, this holding circuit extending from the secondary of transformer 105 through conductor 106, conductor 122, contact 120 in its circuit closing position, conductor 123, contact 111 in its upper circuit closing position, relay 104, and conductor 109. As a result, relay 104 will be deenergized in case the thermostat blade 100a disengages contact C₄ as soon as contact 120 opens thereby returning both the relay contacts 110 and 111 to their lower circuit closing positions. Contact 110 thereupon transfers the control of the valve operating motor to the duct thermostat 36, the transfer circuit extending from the transformer secondary 112 through conductors 113, contact 110, conductor 125, contact 126 of the interlock relay 127 in its lower circuit closing position, conductor 128 to the blade 36a of the duct thermostat. Thus, when the air supplied from the conditioner 10 is above the predetermined tempering value, the blade 36a of duct thermostat 36 will engage with its contact H1 so as to establish an energizing circuit through conductors 129 and 130, limit switch 31, closing winding 27 and conductor 116 to effect the closure of the steam valve 25. However, when the temperature of the air supplied to the room 16 through duct 15 falls below the desired tempering value, the blade 36a of duct thermostat 36 engages with its contact C1 to establish a circuit through conductors 135 and 115, limit switch 32, opening winding 28, and conductor 116 to effect opening of the steam valve 25.

In this way the room thermostat 100 and the duct thermostat 36 jointly control the opening and closing of the steam valve 25 to effect room heating and circulating air tempering operation of the conditioner 10, the room thermostat 100 being effective to initiate room heating operation when the room temperature falls below the lower limit of the temperature range to which the room thermostat 100 is set, and the duct thermostat being effective to initiate duct air tempering operation when the room temperature rises into this range.

Upon an increase in the room temperature to the upper limit of the range between the heating and cooling settings of the thermostat, the blade 100a will engage with its contact H4. Thus, when the periodic contact 101 closes, a circuit from transformer secondary 105 is established through conductor 106, contact 101, conductor 107, blade thermostat 100a in engagement with contact H4, conductor 136, the operating winding of control relay 137, conductors 138 and 109. As a result, contacts 140 and 141 of the control relay 137 are closed. The closure of contact 140 serves to establish a holding circuit for control relay 137 through conductor 142, contact 111, conductor 123, periodic contact 120 when it closes before contact 101 opens, conductors 122 and 106. As a result, control relay 137 will be maintained energized for a limited period even though the blade of room thermostat 100 engages contact H4 only momentarily.

Closure of contact 141 establishes an energizing circuit extending from transformer secondary 143 through conductor 144, the operating winding of the compressor starting relay 145, conductor 146, contact 141, and conductor 147. The resulting closure of main contact 150 energizes the compressor driving motor 56 and thereby starts air cooling operation of the conditioner 10. At the same time, the closure of auxiliary contact 151 completes a circuit from the transformer secondary 152 through conductor 153, the operating winding of the interlock relay 127, conductor 154, contact 151, and conductors 155 and 156. As a result the interlock relay 127 operates its contact 126 from its lower circuit closing position into its upper circuit closing position. This performs two control functions. First, the duct thermostat 36 is rendered ineffective since the circuit to the blade 36a of the thermostat is opened. The second function is the closure of a safety circuit that will energize the valve closing winding 27 to close valve 25 in case the limit switch 131 should be closed. This safety circuit extends from transformer secondary 112 to conductor 113, contact 110, conductor 125, contact 126, conductor 130, limit switch 31 in its circuit closing position, closing winding 27, and conductor 116. However, in normal operation the steam valve 25 will already have been closed and the limit switch 31 opened.

The closure of auxiliary contact 160 of the interlock relay 127 performs a third function by closing a holding circuit extending from transformer 152 through conductor 153, the winding of interlock relay 127, conductor 161, the valve interlock switch 133, conductor 162, auxiliary contact 160, and conductor 156. The valve interlock switch 133 is closed when the valve is operated to its closed position and through the holding circuit maintains the interlock relay 127 energized until valve 25 is operated from its closed position. Thus, even though the room thermostat blade 100a disengages contact H4 so that relays 137 and 145 are both deenergized upon the subsequent opening of periodic contact 120 so as thereby to stop the air cooling operation of the compressor 51, still the holding circuit of the interlock relay 127 remains energized solely under the control of the valve interlock switch 133. This serves to maintain the duct thermostat 36 ineffective after an air cooling operation of the conditioner 10 even though the room air temperature should decrease into the range between the heating and cooling settings of the thermostat 100.

In case the room temperature decreases to the heating setting of thermostat 100, then the steam valve 25 will be opened in the manner previously described to effect an air heating operation of the conditioner 10. Upon the opening of valve 25, the interlock switch 133 is opened thereby opening the holding circuit of the interlock relay 127. As a result, the interlock contact 126 is returned to its lower circuit closing position in which it is shown so as thereby to transfer the control of the closing and opening of valve 25 to the duct thermostat 36 when the blade 100a of the room thermostat disengages contact C4, and relay 104 is deenergized so as to return contact 110 to its lower circuit closing position to complete the control transfer to the duct thermostat 36a through conductors 125 and 128. Thus, it will be seen that the duct thermostat 36 is rendered ineffective to control the opening and closing of the steam valve 25 as soon as air cooling operation of conditioner 10 is initiated, and that the interlock relay 127 serves to maintain the duct thermostat 36 ineffective thereafter until after the room temperature decreases sufficiently to effect a heating operation of the conditioner 10 and then rises within the range between the air cooling and air heating settings of the room thermostat 100.

What I claim as new and desire to secure by Letters Patent of the United States is:

1. In combination, a space air conditioner having air circulating means provided with means for mixing fresh air with the circulated air, means for heating said mixture, including a reversible motor operated steam valve, means for cooling said mixture including a separate motor operated compressor, thermostatic control means responsive to the space temperature for operating said compressor when the space temperature rises above a predetermined temperature range and for opening said steam valve when the space temperature falls below said predetermined temperature range, a separate thermostatic control means responsive to the temperature of said mixture, and means under control of said first thermostatic control means for rendering said separate thermostatic control means effective to control the closing and opening of said valve in accordance with variations in the temperature of said mixture only when the space temperature rises into said range.

2. In combination, a thermostatic control mechanism responsive to the temperature of a space, air conditioning apparatus having means for supplying air to said space and having air heating means and air cooling means operable under control of said control mechanism for selectively heating and cooling the air supplied to said space when the temperature of said space varies respectively below and above a predetermined temperature range, and means including a thermostatic control device responsive to the temperature of the air supplied to said space and rendered effective under control of said space temperature responsive control mechanism for operating said air heating means to temper the air supplied to said space when the temperature of said space rises into said range.

3. In combination, a space air conditioner having a fresh air inlet and having air heating and cooling means provided with thermostatic control mechanism for responding to the temperature of the space to selectively heat or cool the air supplied to said space when the temperature of said space varies respectively below and above a predetermined temperature range, and means including a thermostatic device responsive to the temperature of the air supplied to said space and rendered effective under control of said space temperature responsive control mechanism for regulating the temperature of the fresh air supplied to said space when the temperature of said space rises into said range.

4. In combination, means including thermostatic control mechanism responsive to the temperature of a space for selectively heating and cooling a heat transfer medium for said space when the temperature of said space respectively falls below and rises above a predetermined temperature range, and means including a separate thermostatic device responsive to the temperature of said medium and rendered effective under control of said space temperature responsive control mechanism for regulating the temperature of said medium only when the temperature of said space rises into said range.

5. In combination, cooling control means including a thermostat, heating control means including a thermostat and a reversible motor operating valve under control of said thermostat, and a separate thermostat having means for reversibly operating said valve rendered ineffective under the control of said cooling thermostat and effective under the control of said heating control thermostat.

6. In combination, means including a first temperature responsive device for oppositely changing a temperature condition upon opposite variation thereof outside a predetermined range, and means including a second automatic temperature responsive device responsive to a second temperature condition thermally influencing said first temperature condition for regulating said second temperature condition and having interlocking means selectively controlled by said first automatic temperature responsive device to render said second automatic temperature responsive device effective when said first temperature condition varies into said range from outside one predetermined limit thereof and ineffective when said first condition varies into said range from outside the other limit thereof.

7. In combination, means including a first automatic temperature responsive device for oppositely changing a temperature condition upon opposite variation thereof outside a predetermined range, and cooperating means including a second automatic temperature responsive device responsive to a second temperature condition thermally influencing said first temperature condition and controlled by said first automatic temperature responsive device to regulate said second temperature condition when said first temperature condition varies into said range from outside one predetermined limit thereof, and interlocking means controlled by said first temperature responsive device for rendering said second temperature responsive device ineffective when said first temperature condition varies into said range from outside the other limit thereof.

WALLACE B. MILLER.